(12) United States Patent
Johnston et al.

(10) Patent No.: US 6,641,449 B2
(45) Date of Patent: Nov. 4, 2003

(54) HIGH PRESSURE LAMP BULB AND METHOD OF INDUCTION SEALING

(75) Inventors: David W. Johnston, Kensington, NH (US); Ernest A. Davey, Jr., Raymond, NH (US); Gregory Zaslavsky, Marblehead, MA (US); Dana L. Caldwell, Middleton, MA (US)

(73) Assignee: Osram Sylvania Inc., Danvers, MA (US)

( * ) Notice: Subject to any disclaimer, the term of this patent is extended or adjusted under 35 U.S.C. 154(b) by 265 days.

(21) Appl. No.: 09/841,424

(22) Filed: Apr. 24, 2001

(65) Prior Publication Data

US 2002/0153838 A1 Oct. 24, 2002

(51) Int. Cl.⁷ .................................................. H01J 69/26
(52) U.S. Cl. ........................................... 445/43; 445/44
(58) Field of Search ....................................... 445/43, 44

(56) References Cited

U.S. PATENT DOCUMENTS

| | | | |
|---|---|---|---|
| 3,582,175 A | * | 6/1971 | Uno .............................. 445/9 |
| 4,746,316 A | * | 5/1988 | Sudo et al. .................... 445/43 |
| 4,768,985 A | | 9/1988 | Hamai |
| 4,810,932 A | | 3/1989 | Ahlgren |
| 4,868,458 A | | 9/1989 | Davenport |
| 4,891,555 A | | 1/1990 | Ahlgren |
| 5,008,592 A | | 4/1991 | Pragt |
| 5,045,748 A | | 9/1991 | Ahlgren |
| 5,087,218 A | | 2/1992 | Ahlgren |
| 5,133,682 A | | 7/1992 | Gilligan |

FOREIGN PATENT DOCUMENTS

| WO | WO 98/50942 | 11/1998 |
|---|---|---|
| WO | WO 98/50943 | 11/1998 |

* cited by examiner

Primary Examiner—Kenneth J. Ramsey
(74) Attorney, Agent, or Firm—William E. Meyer (57) ABSTRACT

A high pressure, lamp may be made in a pressure vessel by using an induction coil to melt an edge portion of a sealing wafer pressed against the circumference of an opening in the body of the lamp envelope. The pressure vessel and the lamp envelope are filled with desired fill materials. Induction heating is carried out by the induction coil and induction receiver that presses against the wafer, the lamp envelope or both to hold the melting piece or pieces in contact. The induction receiver may be fused to the lamp body forming a functional part of the overall lamp structure. The preferred resulting lamp includes a bonded metal piece that can be conveniently used for electrical or mechanical coupling or positioning of the lamp with respect to a base.

23 Claims, 11 Drawing Sheets

FIG. 15

HIGH PRESSURE LAMP BULB AND METHOD OF INDUCTION SEALING

TECHNICAL FIELD

The invention relates to electric lamps and particularly to high pressure electric lamps. More particularly the invention is concerned with a seal structure and a method of sealing a high pressure electric lamp.

BACKGROUND ART

An electric lamp with a long life has been a constant goal since the time of Edison. One method is to use a larger filament, but that requires larger supports, envelope and so on. The whole structure becomes more expensive and may be less efficient. Another method is to use a high pressure fill gas that resists filament evaporation. Unfortunately, high pressure lamps can mechanically fail, and large high pressure lamps inherently contain more stored energy than small lamps. Large high press lamps are then seen to be dangerous and uneconomical. On the other hand small, high pressure lamps, while potentially economical, can be difficult to accurately construct and fill to a proper pressure due to small irregularities in their construction. These variations in pressure result in lamps with unreliable life spans. The typical method of filling a high pressure lamp requires filling and purging the lamp one or more times to remove fouling materials from the lamp. To do this through a small exhaust tube is time consuming, and does not necessarily yield a consistently clean lamp. There is a need for a method to fill high pressure lamps without using an exhaust tube. The exhaust tube process is slow because it requires filling to be completed at a first station before sealing of the tubulation is started at a second station. There is also a need for a filling process wherein the lamp is filled and the bulb are sealed simultaneously.

Freezing out fill materials, while sealing the exhaust tubulation is a known process. Freezing out the fill material to enable the sealing process is costly, and along with the necessary fill material, tends to freeze out materials that can foul the lamp. Dirty lamps tend to have shorter lives than clean lamps.

Long life, efficient incandescent lamps can be produced by using a high-pressure fill gas, such as xenon, to inhibit tungsten evaporation at higher coil temperatures. Products of this type are being considered for use as automotive turn signal lamps. A second desired feature for signal lamps is compact size that to then reduce the reflector and lens size needed for the optical system. Reducing the typical seal geometry along with precisely placing the filament would enable for a more compact lamp, and lamp system.

Philips NV has introduced a high pressure, compact light source for automobile turn signal applications. The technology, materials and processes involved in making the lamp are described in international patents WO 98/50942 and WO 98/50943. In this product, a sintered glass wafer is used a platform to mount a filament. The sintered glass wafer is stable during sealing and it occupies less space than a conventional mount or press seal. The sintered glass wafer requires a solder glass seal formed between the bulb and sintered glass wafer. The wafer is comprised of powdered and pressed P-360 glass that is sintered with two lead wires and a metal exhaust tube to form a hermetic component. After coil mounting, the sintered glass mount and bulb are joined by a solder glass in an inert or reducing atmosphere, to protect the filament. The bulb and mount assembly is then placed in a vessel that is attached to a vacuum and filling system. The lamp is "cleaned" or outgased and the vessel, including the internal volume of the lamp, is filled with high-pressure xenon (3 to 8 bar). This filling method is said to be cleaner than the common method of high pressure filling of lamps using liquid nitrogen to freeze out a fill gas. Laser welding the metal exhaust tube then tips off the lamp, while the vessel is under pressure. Alternatively, an electric arc or plasma weld is suggested as a tipping processes.

The tubulated lamp with a freeze out process has several disadvantages. The metal exhaust tube is expensive, and the frit glass wafer is more difficult to make than a typical glass mount. The solder glass seal process is a time consuming operation and requires large equipment for high rates of production. The overall result is a relatively expensive lamp that meets the criteria of long life and compact design

DISCLOSURE OF THE INVENTION

A high pressure lamp may be made by providing a high pressure vessel; locating an electric induction energy source near the vessel; and locating in the vessel a lamp capsule having a wall defining an enclosed volume and an opening. The high pressure vessel is then filled so that the enclosed volume is filled with a fill material. A melt fusible wafer is located adjacent the opening with the wafer spanning the opening. The wafer is pressed by an electric induction heatable energy receiver against the wafer. By supplying sufficient electric power to the induction energy source to induce heating of the receiver, the portion of the wafer may be melted, fusing the wafer to the capsule along the opening thereby sealing the capsule.

BEST MODE FOR CARRYING OUT THE INVENTION

Figure 1:
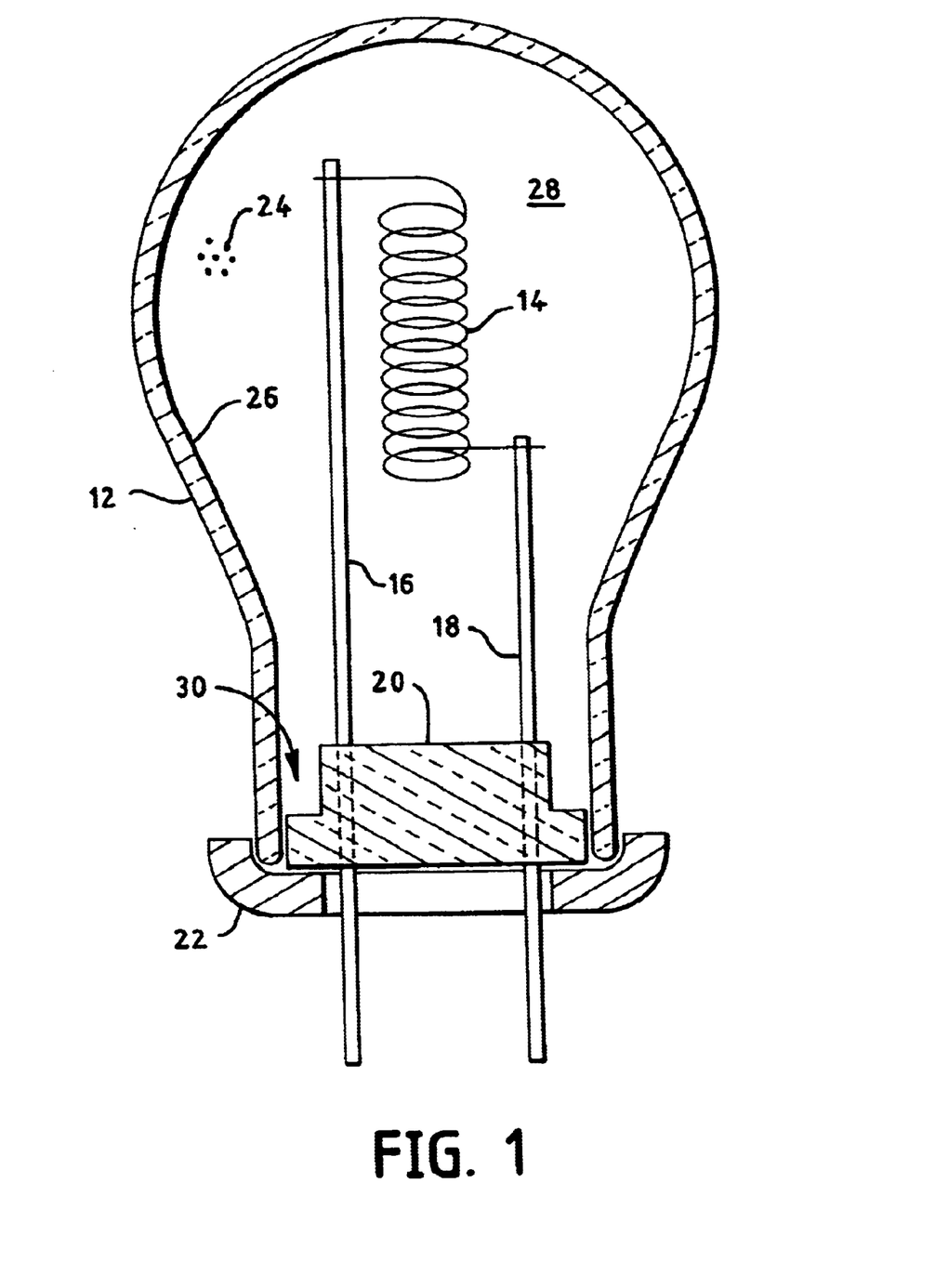
FIG. 1 shows a cross sectional view of a wafer sealed lamp prior to sealing.
Figure 2:
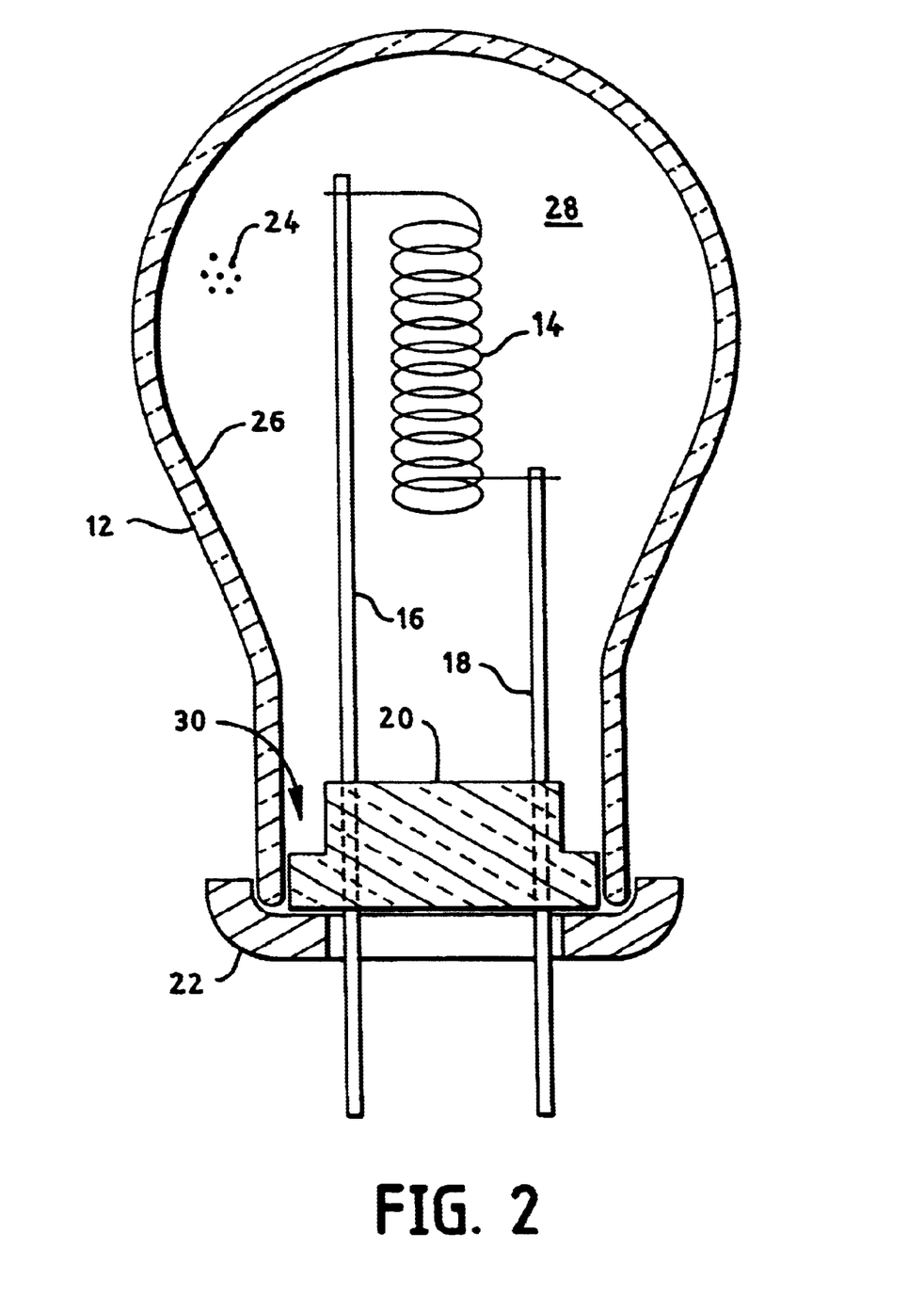
FIG. 2 shows a cross sectional view of a wafer sealed lamp after sealing.

FIG. 1 shows a cross sectional view of a wafer sealed lamp 10. FIG. 2 shows a cross sectional view of a wafer sealed lamp after sealing. The wafer sealed lamp may be formed from an envelop 12, a light source, such as a filament 14, and support leads 16, 18, a wafer 20, a ferrule 22 and a fill material 24.

The envelope 12 is a light transmissive body having a wall 26 defining an enclosed volume 28 and at least one opening 30. The preferred envelope 12 has a spherical bulb portion with a cylindrical neck portion including the opening 30. The envelope 12 may be made from soft glass, hard glass, quartz, PCA or other known light transmissive materials capably of being melt fused with the wafer 20 to form a gas tight seal. While less preferred, frit sealing the tube material and wafer material is also possible.

Figure 3:
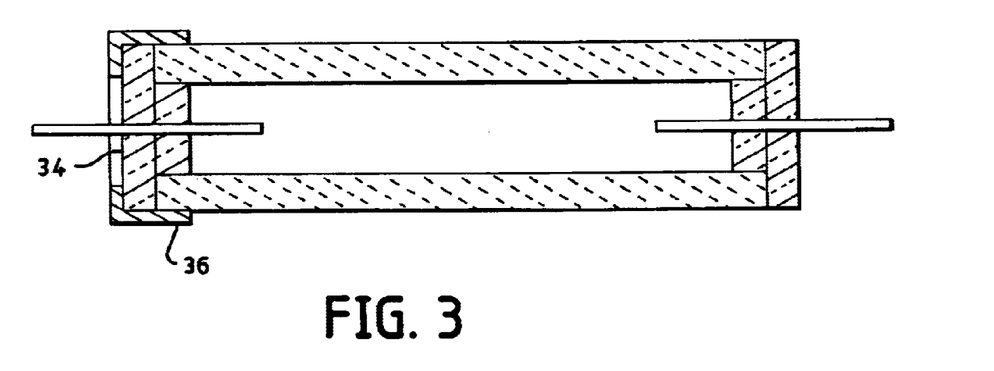
FIG. 3 shows a cross sectional view of a discharge lamp.

The preferred light source is a filament 14 electrically coupled through support leads 16, 18. The particular filament size, form, and support are matters of design choice. The Applicants have used straight coils whose legs were laser welded to straight leads. Alternatively, a discharge source may be used. FIG. 3 shows a cross sectional view of a discharge lamp that may be made according to this disclosure with wafer 34, and ferrule 36.

Figure 4:
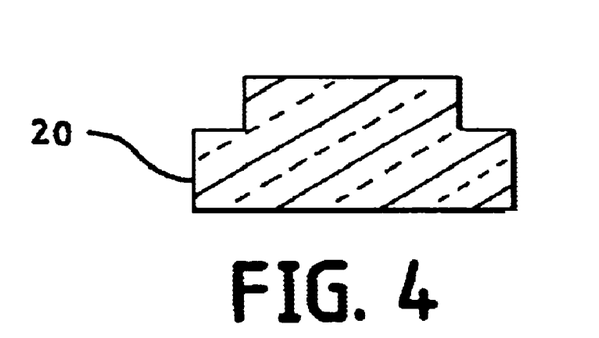
FIG. 4 shows a cross sectional view of a wafer.
Figure 5:
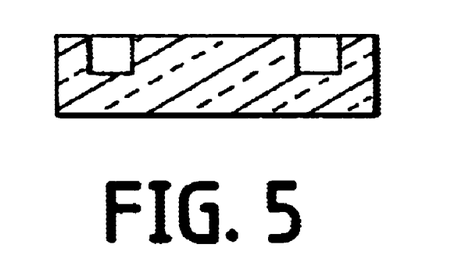
FIG. 5 shows a cross sectional view of an alternative wafer with a tongue and groove coupling.
Figure 6:
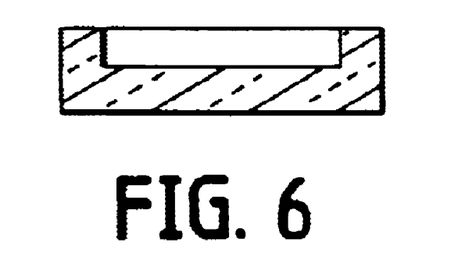
FIG. 6 shows a cross sectional view of an alternative wafer with a cap like coupling.

FIG. 4 shows a cross sectional view of a wafer 20. The wafer 20 is designed to close the opening 30. The wafer 20 should abut or nearly abut the envelope 12 along the edges defining the envelope opening 30. For example, the envelope opening 30 may have a slightly larger diameter than the wafer's 20, so the wafer 20 may fit snuggly inside the envelope opening 30 something like a cork. Alternatively, the wafer 20 may abut the end wall of the envelope 12 along the opening region. Still further, the wafer 20 may straddle the envelope wall adjacent the exterior side of the tubular wall. The envelope 12 and the wafer 20 may include complementary or conformal surfaces such as staircases, tongue and groove, or similar abutting features to provide well controlled adjacency. FIG. 5 shows a cross sectional view of an alternative wafer with a tongue and groove coupling. FIG. 6 shows a cross sectional view of an alternative wafer with a cap like coupling. Despite the conformal surfaces, there are normally sufficient, at least microscopic variations between the adjacent pieces so that the fill gas 24 may penetrate the region between the conformal surfaces to allow the fill gas 24 to fill the enclosed volume 28. Dimensional allowances or formal passages can also be used to assure through flow during filling. Purging and filling a surrounding vessel 52 then results in purging and filling the enclosed volume 28. A frit may also be used, for example by painting the frit on the relevant region to be sealed.

Figure 7:
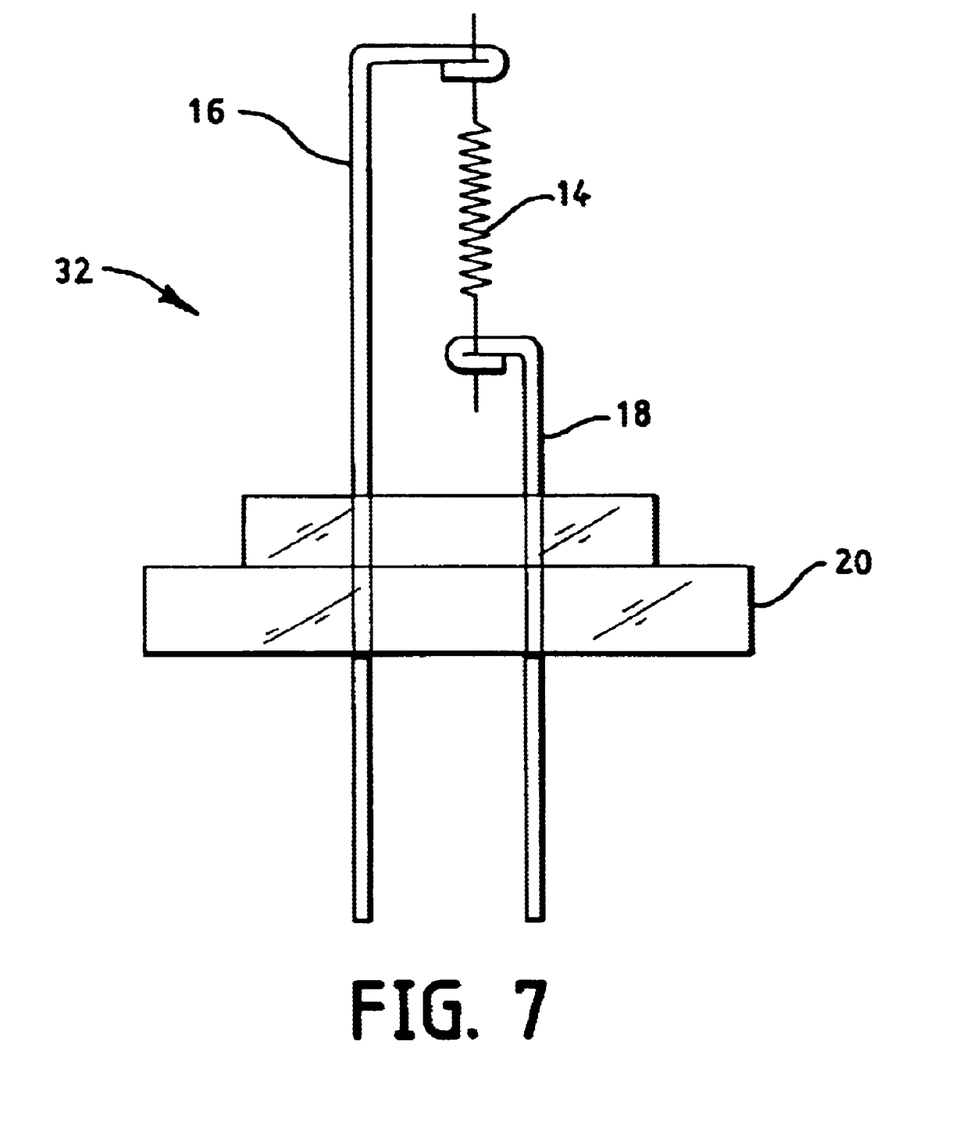
FIG. 7 shows a perspective view of a subassembly.

The wafer 20 may be formed from soft glass, hard glass, quartz, PCA or other known materials capable of being melt fused with the envelope 12 to form a gas tight seal. The choice of the wafer material is substantially determined by its ability to seal well with the envelope 12 and the leads 16, 18. In the preferred embodiment, the wafer 20 is made from granular glass material that is shaped to seal with the leads 16, 18 extending through the wafer 20, and to form a convenient conformal coupling to seal the opening 30. There are numerous alternatives to straight through lead seals, such as foils, rivets, and so forth that may be used. It is only important that a hermetic or vacuum tight electrical connection be made through the wafer 20, and that there be mechanical support, if necessary, for the light source in the enclosed envelope 12. The leads 16 and 18 are positioned in the granular wafer material to be sintered in place to seal with the wafer 20, and a filament 14 is crimped or welded in place to the lead ends thereby completing a subassembly 32. FIG. 7 shows a perspective view of a subassembly. While it is convenient to form some or all of the light source structure as part of the wafer, in a less preferred embodiment, some or all of the light source could be pre-formed as part of the envelope 12.

The ferrule 22 is made from a material that may be heated inductively so as to transmit heat to the conformal sealing surfaces between the envelope 12 and wafer 20 (or frit, as the case may be). The preferred ferrule 22 is a metal ring having a lip, which may be curved, to conformally fit with either or both the envelope 12 and the wafer 20, adjacent where the envelope 12 and wafer 20 meet. The metal ferrule 22 can be additionally shaped to hold the envelope 12 and wafer 20 in proper registration during sealing. In one embodiment the ferrule 22 included a curved step to scoop the melting envelope wall 26 inwards to contact the wafer 20. In actual construction the ferrule 20 tends to bond to the envelope 12, the wafer 20 or both during the melting and fusing. The associated coefficients of thermal expansion are then preferably coordinated to assure a stable structure. The fused in place ferrule 22 must be sufficiently offset from at least one of the leads 16, 18 so as to not short circuit the two leads 16, 18. The preferred method is to form the ferrule 22 as a ring to surround and be offset from both leads 16, 18. The ferrule 22 may also be used as a portion of a circuit for one of the leads. For example one of the leads may be electrically connected to the ferrule 22, and the ferrule 22 then further connected electrically to a conductive basing piece, such as a threaded base.

Figure 8:
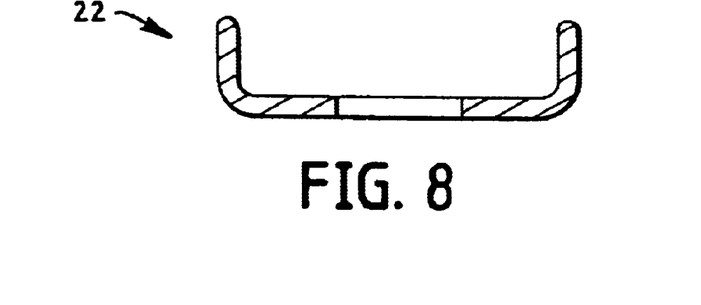
FIG. 8 shows a cross sectional view of a ferrule.
Figure 9:
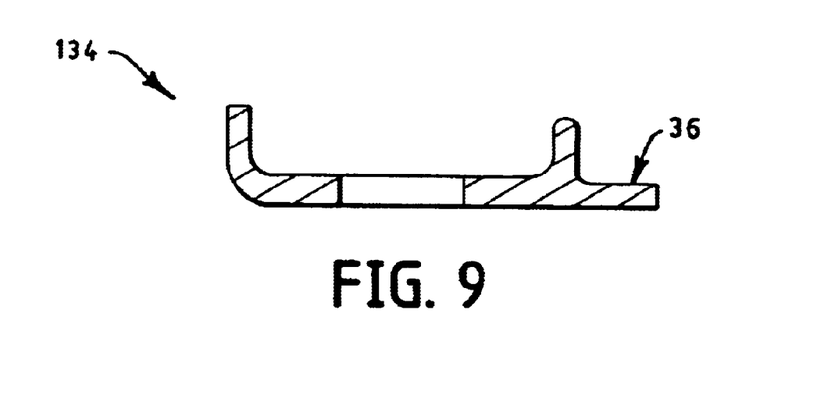
FIG. 9 shows a cross sectional view of an alternative ferrule with a tab.
Figure 10:
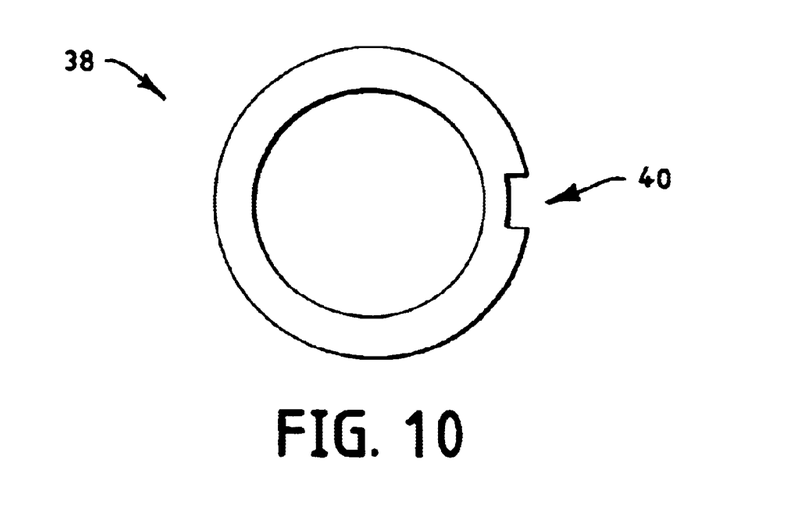
FIG. 10 shows an end view of an alternative ferrule with a notch.
Figure 11:
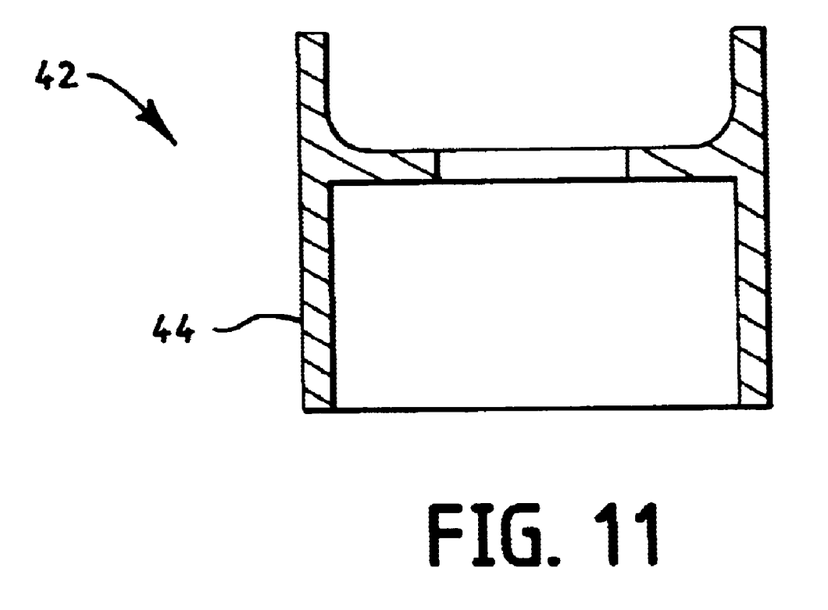
FIG. 11 shows a cross sectional view of an alternative ferrule with an extended cylindrical wall.
Figure 12:
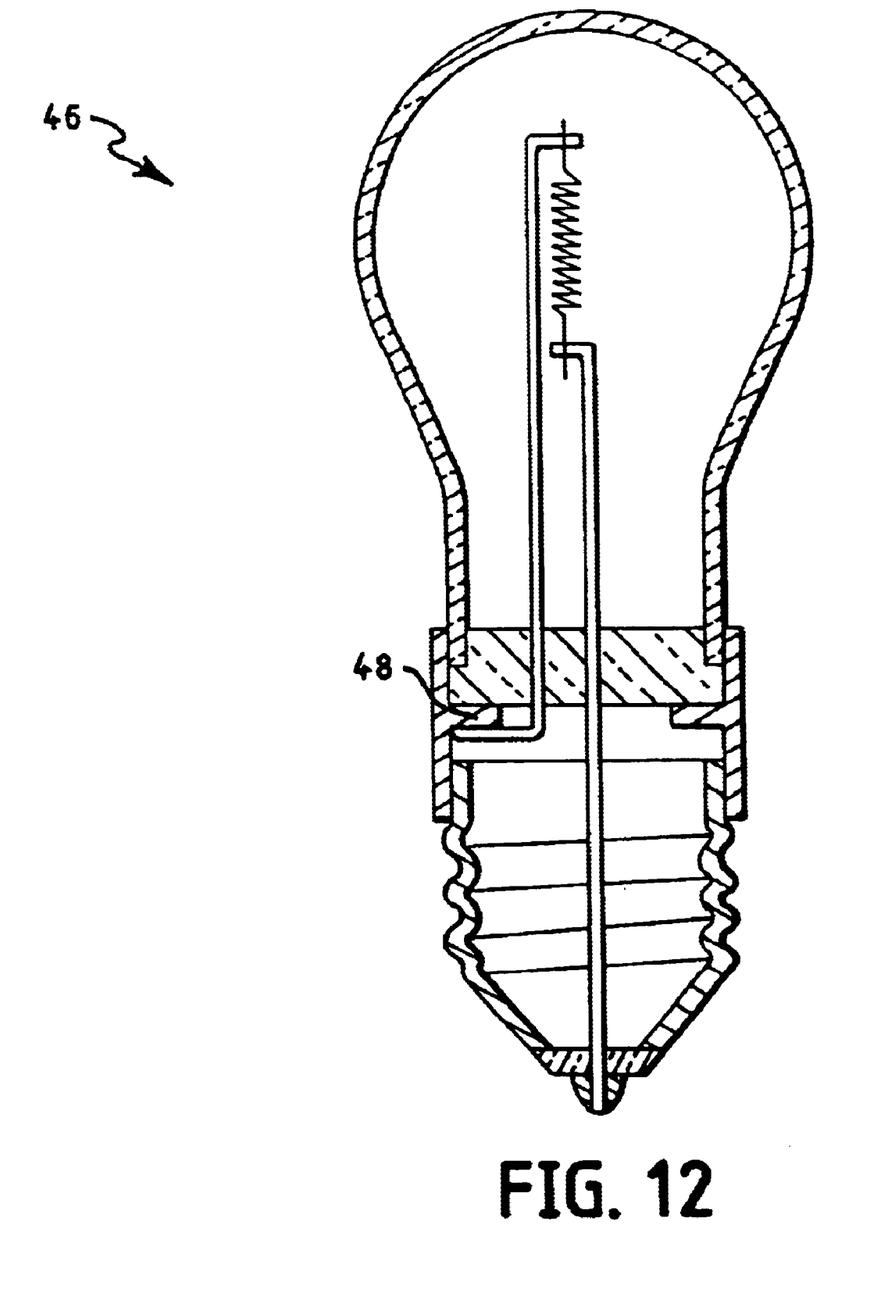
FIG. 12 shows a cross sectional view of a filament lamp adapting the extended ferrule as a portion of the circuit.

The preferred ferrule 22 is a metal ring that abuts the envelope 12 or the wafer 20; however, it is understood that the ferrule may have a variety of other forms or features, including being a ring as a flat plate, include a series of radial fingers, have a sloped wall or have a staircased wall. What is relevant is the ferrule reliably transfers the supplied induction energy as heat to the one or both of the envelope and the wafer in the region of the seal to be made between them. The ferrule may also provide a stable frame to hold the envelope and wafer pieces in place during bonding. The ferrule may also provide a gentle pressure to keep the envelope and wafer pieces in contact during bonding. FIG. 8 shows a cross sectional view of a preferred ferrule 22. FIG. 9 shows a cross sectional view of an alternative ferrule 134 with a tab 36. FIG. 10 shows an end view of an alternative flat ring ferrule 38 with a notch 40. FIG. 11 shows a cross sectional view of an alternative ferrule 42 with an extended cylindrical wall 44. FIG. 12 shows a cross sectional view of a filament lamp 46 adapting the ferrule 48 as a portion of the electrical connection circuit.

Figure 13:
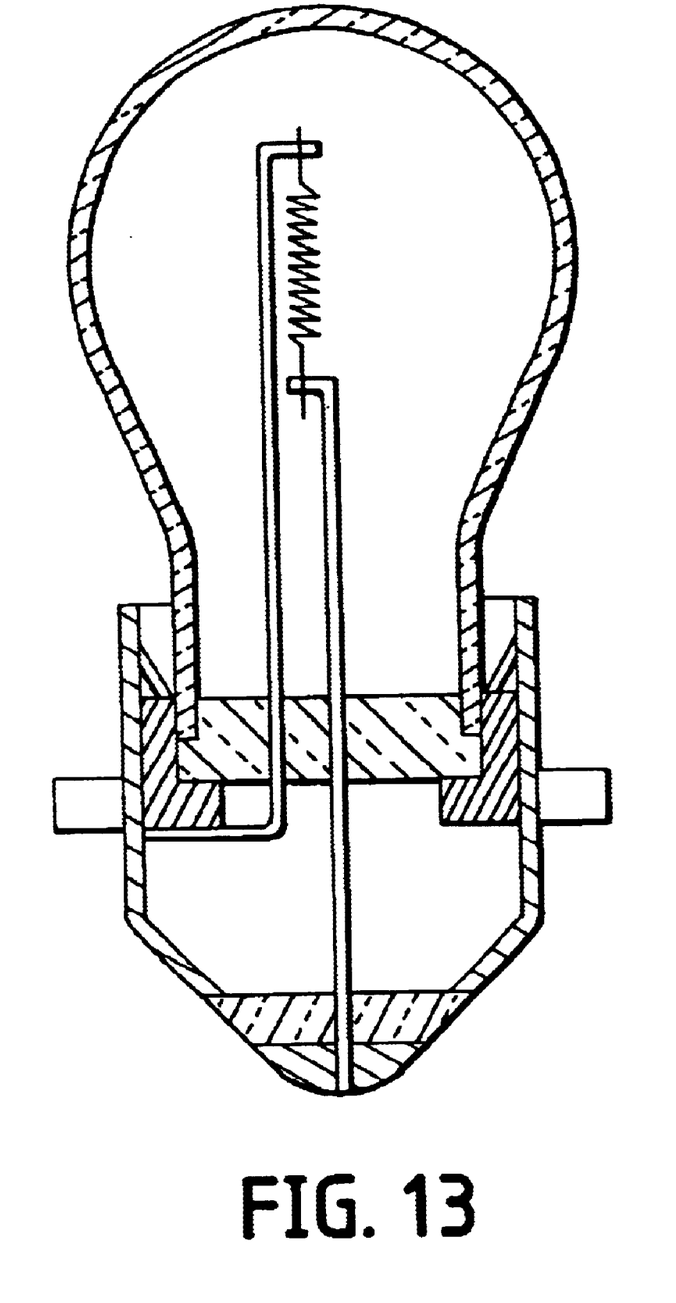
FIG. 13 shows a cross sectional view of a filament lamp adapted as a bayonet lamp.
Figure 14:
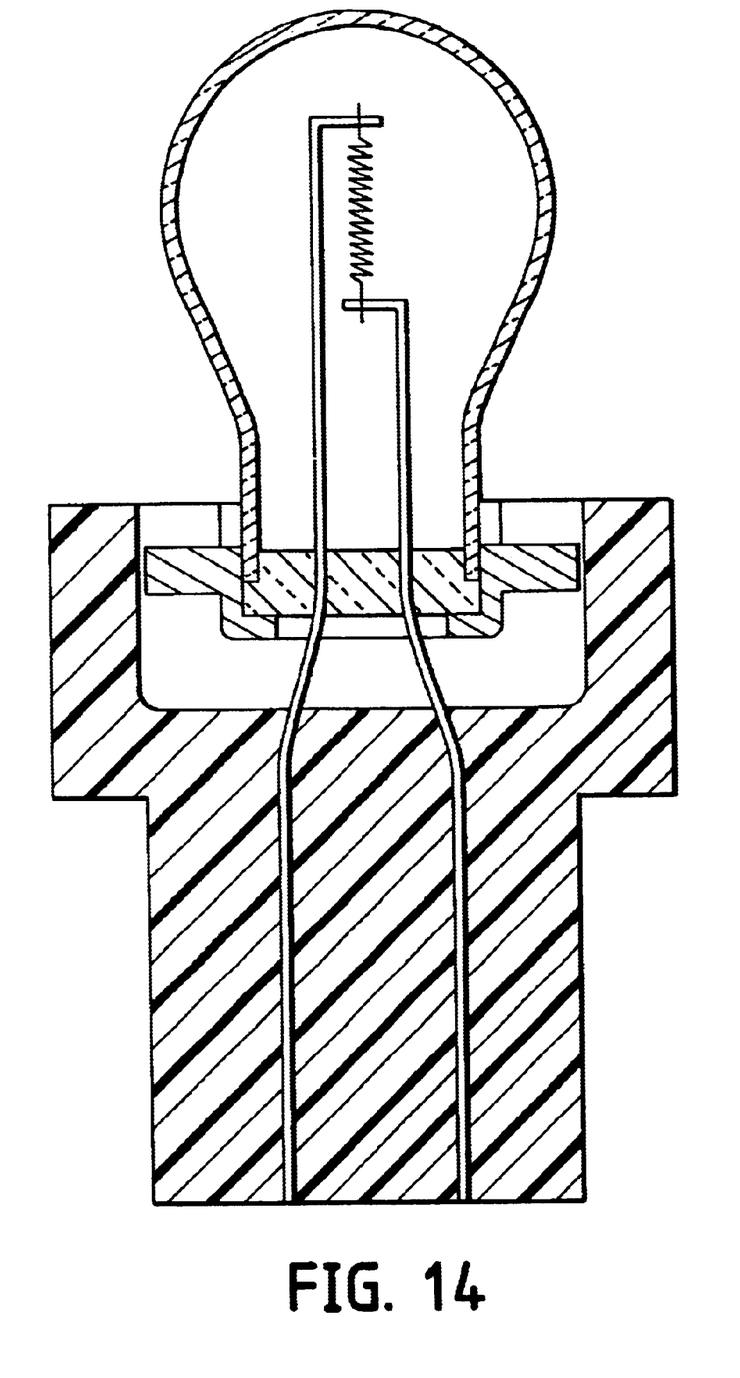
FIG. 14 shows a cross sectional view of a filament lamp adapted as a wedge lamp.

With the ferrule bonded to the envelope, the metal ferrule may be sculpted to include any of a variety of additional mechanical features. The metal ferrule may include positioning features such as projections or indentations, it may include mechanical coupling features so that the filled lamp may be directly clipped, welded, or otherwise coupled to a base. The final lamp may then be oriented with respect to the filament, the leads or other features of the lamp, or mounted for assembly into a greater structure by such additional ferrule features. For example the ferrule may include a cylindrical wall with a groove or thread, and the first lead may be electrically coupled to the ferrule. The second lead may extend axially directly from the center of the lamp opening through the open center portion of the ferrule. A threaded, center contact type base may then be snapped on to the ferrule. The ferrule and threaded base are then spot welded, and the center lead threads through the threaded base and coupled by known means as the center contact. This rapid assembly is an immediate result of pre-attaching the envelope to an adapter type ferrule. FIG. 12 shows the threaded lamp structure. The lamp capsule may be similarly adapted for use in other known lamp structures. FIG. 13 shows a cross sectional view of a filament lamp adapted as a bayonet lamp. FIG. 14 shows a cross sectional view of a filament lamp adapted as a wedge lamp.

As a less preferred alternative, the lamp may be constructed with a ferrule whose coefficient of thermal expansion is mismatched with respect to the envelope or wafer to intentionally induce separation of the ferrule after sealing.

Figure 15:
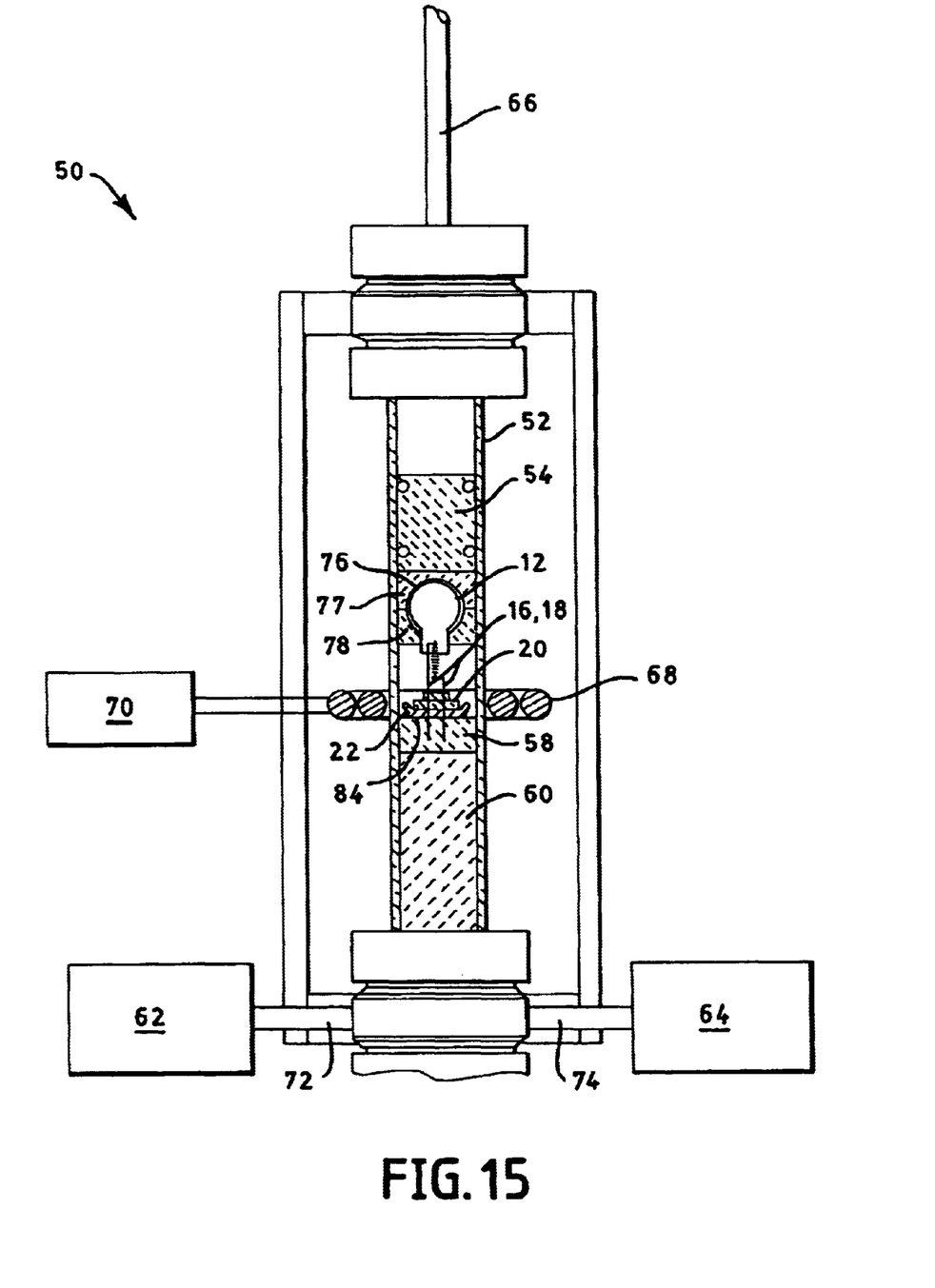
FIG. 15 shows a schematic view of a high pressure filling system.

The wafer sealed lamp 10 has no exhaust tube through which the lamp may be filled. Filling the enclosed volume 28 with the lamp fill 24 and then sealing the lamp 10 then requires special assembly equipment and a new assembly method. FIG. 15 shows a schematic view of a high pressure filling system. The wafer sealed lamp 10 may be formed in a high pressure, RF (radio frequency) sealing system 50. A high pressure, RF sealing system 50 may be made with a vessel 52, a first piston 54, a lamp holder 78, a wafer holder 58, a second piston 60, a vacuum system 62, a filling system 64, a piston actuator 66, an inductive coil 68, and a power supply system 70.

The vessel 52 provides a wall defining an interior space sufficient to hold the lamp elements before and after the sealing process. The vessel 52 includes an access port through which the unassembled lamp elements maybe loaded, and an access port through which the assembled lamp may be retrieved. These access ports may be the same port. The preferred vessel 52 is joined to the vacuum system 62 by a vacuum coupling 72 and is joined to a filling system 64 by a fill couplings 74. The sealing vessel 52 may be purged and flushed and then filled with the lamp fill gas 24 by operating the vacuum system 62 and filling system 64 in sequence. External heat can be applied to the vessel 52 during the vacuum processing to properly outgas unwanted lamp materials. The preferred vessel 52 is a large diameter quartz tube with one end plugged with a closure, for example a first ceramic piston 54 sealed with one or more O-rings to close with the interior of the quartz tube. The first piston 54 seals an end of the vessel 52 acting as both the input and exit access port for the lamp 10. The preferred closure, piston 54, includes a recess 76 formed to receive and position a portion of the envelope 12. In one embodiment, the recess was formed as part of interchangeable piece 77 coupled to a flat piston face. The two pieces otherwise acted as a single piston. The vessel 52 must sustain the fill pressure, and in the preferred embodiment must allow the transmission of RF energy into the vessel 52, providing the heat for the sealing process. The vessel 52 must also sustain the temperatures of the sealing process. The preferred vessel 52 is as small as possible, and is otherwise closed off or filled to lower the total gas volume required for each cycle of the filling process. Minimizing the gas volume of the vessel 52 reduces the cycle time, and the expense of any gas lost in the purging and filling cycles.

One way to minimize the vessel 52 volume is to enclose the lamp envelope 12 with a form fitting lamp holder 78 that extends to the vessel 52 wall. In this way a maximum of the vessel 52 volume is filled with the inert lamp holder 78, while only small gas volume passages surround and link to the envelope 12. The lamp holder 78 then acts to hold the envelope 12 in place, and reduces the volume in the vessel 52 that needs to be purged and filled. The lamp holder 78 should also not interfere with the transmission or reception of the inductively supplied power. The preferred lamp holder 78 is a ceramic piece shaped to conformally fit around the envelope 12 leaving a sufficient portion of the envelope end with opening 30 exposed so the wafer subassembly 32 may be fitted to the envelope opening 30. In one embodiment, the lamp holder 78 was formed as a ring conforming to the exposed end of the lamp envelope. The lamp holder 78 was pinned to the interchangeable recess forming piece of the first piston to align and hold the lamp holder 78 in place.

The wafer holder 58 holds the wafer assembly 32 and, should also not interfere with the transmission or reception of the inductively supplied power. The wafer holder 58 may also act to reduce the open volume of vessel 52 to be purged and filled. The preferred wafer holder 58 is a ceramic piece with two recesses 80, 82 to hold the exterior ends of the leads 16, 18, and a face 84 to press against the adjacent ferrule 22. The preferred wafer holder 58 may be further formed with recesses or passages to allow purging and filling materials to flow between the vacuum system 62, and filling system 64 and the envelope opening 30. The wafer holder 58 may be alternatively formed as a subsection of the second piston 60, or as a separate (interchangeable) piece positioned relative to the second piston 60.

The second piston 60 supports the wafer holder 58. The second piston 60 may be sealed to the vessel 52 with compression seals such as O-rings. The piston 60 may be moveable to provide a small pressing force to keep the ferrule 22 in contact with either the envelope 12, the wafer 20 or both as may be the case during sealing. While it is convenient to form the pressure vessel 52 as a tube with two closing pistons, it is understood that one piston could be replaced with a seal, cap or similar closure as a fixed or permanent closing for one end of the pressure vessel 52.

The preferred vessel 52 interior is ported to the vacuum system 62 by the vacuum coupling 72. The vacuum system 52 exhausts non-fill materials from the vessel 52, including the lamp envelope 12.

The preferred vessel 52 is also ported to the filling system 64 by filling coupling 74. The filling system 64 may supply purging gas, if any is used, and supply fill materials 24 for the envelope 12 interior 28. It is understood that a single vacuum and filling system may be used. In general, during the sealing process with the envelope 12 filled, the enclosed fill material 24 is heated along with the edges of the envelope 12 and the wafer 20. The fill material 24 then tends to expand, increasing the envelope 12 pressure, which could blow out the lamp seal being formed. To compensate between the interior envelope 12 pressure and the vessel 52 pressure during the sealing process, the preferred filling system 64 includes pressure regulation. The preferred filling system 64 compensates for the increasing interior envelope 12 pressure by correspondingly increasing the vessel 52 pressure during sealing to provide an equal and offsetting pressure on the seal exterior. The particular pressure compensation process depends on the particular volumes, materials, heating and melting rates. Tuning the schedule for the applied pressure is felt to be within the skill of lamp making engineers. The preferred final lamp fill pressure is established through a pressure control as part of the fill system 64. The pressure control may also increase and decrease the pressure slightly to "work" the sealing materials as they join, as well as, compensating for any pressure differences between the interior and exterior of the lamp.

The piston actuator 66 may respond to the applied vessel 52 pressure to assure the access piston does not overpress the wafer 20 against the envelope 12, and also does not allow the first piston 54 to retreat during the sealing cycle, thereby pulling the envelop 12 away from the wafer and ferrule subassembly 32 during sealing. A spring may be included in the mechanical path between the actuator 66 and the envelope 12 to help assure gentle contact between the envelope 12 and the wafer 20.

The RF induction coil 68 supplies inductive power to heat the ferrule 22. The ferrule 22 then acts as an RF induction receiver positioned adjacent where the envelope 12 and wafer 20 are to be melted and fused. In the preferred embodiment, the vessel 52 exterior is encircled by the RF induction coil 68 approximately in the plane of where the ferrule 22 is located for sealing. It is possible to construct a vessel wherein the inductive coil is enclosed in the vessel by ducting power leads through a closed end of the vessel, and positioning the induction coil adjacent a wafer holder. The wafer subassembly is then inserted in the wafer holder. Subsequently, the envelope end is brought in riding on the moveable piston for filling and sealing. The glass surfaces near or in contact with the metal ferrule are then heated in a controlled manner so that the glass parts fuse to each other and possibly the metal ferrule. The flow of melted glass during sealing results in a lamp with a continuous glass inner surface. The whole wafer 20 does not melt during sealing. Only an edge portion of the wafer 20 adjacent the ferrule 22 melts. The leads 16, 18 then maintain their correct positions allowing precise placement of the filament 14 with respect to the outer leads 16, 18.

The power supply 70 supplies power to the induction coil 68.

The following steps are used to make the preferred embodiment of the lamp. First a high pressure filling vessel 52 is provided.

The subassembly 32 is mounted on the wafer support 58. Next, a lamp envelope 12 is positioned in the vessel 52. The lamp envelope 12 is preferably held in a conformal mold like structure to minimize the remaining vessel 52 interior volume. The mold structure also assures proper orientation, and positioning of the envelope 12 during the sealing stage. The envelope 12 is advanced towards the subassembly 32 until the envelope 12 is properly located around the filament 14, and the envelope 12 is brought into proper adjacency with the wafer 20 to close or nearly close with opening 30. Alternatively, a slight gap may be left to speed gas flow.

The vessel 52 is then evacuated to withdraw lamp fouling materials. If purging cycles are used, the vacuum system 62 and filling system 64 are operated to withdraw the ambient fill material, and replace it with clean material. During this phase the envelope 12 may be heated to assist in the withdrawal of the material being purged.

The evacuated vessel 52 and, and as a result the lamp envelope 12 are then filled with the fill gas 24 composition chosen to remain in the finished lamp. The system is structured to provide a cold fill pressure in the lamp greater than 1 atmosphere. The preferred cold pressure is about 3 atmospheres. (There is no upper limit to the possible fill pressure, although ten atmospheres (cold) is believed to be the present limit at which safe and economical lamps are possible.) Compensation in the gas pressure for the elevated temperature of the lamp envelope is made so that after the lamp cools, the fill gas will be at the desired final (cold) pressure. The envelope 12 may then be advanced slightly to close any remaining gap with the subassembly 32.

The envelope 12 and the wafer 20 are then held in contact with the RF energy receiving ferrule 22. The sealing pressure may be provided by a spring, gravity, magnets or any other convenient pressing means. The amount of pressure needed on the envelope 12 and wafer 20 is only that pressure sufficient to sustain contact while the envelope 12 and wafer 20 are heated to a fusible state. The sealing pressure need not be that sufficient to hold the pressure ultimately built into the lamp. The sealing pressure may be only a gentle force sufficient to keep the two fusing pieces in contact. The contact pressure may be adjusted by the piston actuator 66 if necessary.

Once the envelope 12 and wafer 20 are in position, and under gentle pressure by the ferrule 22, the RF power source is turned on to supply the induction coil 68. The induction energy causes the ferrule 22 to heat. With the nearby ferrule 22 heated, the envelope 12 and wafer 20 are induced to heat near their mutual contact seam. This heat is conducted into the joint region between the envelope 12 and the wafer 20. With sufficient heating, the envelope 12 and wafer 20 (or frit, if used) fuse to form a continuous gas tight seal. During the sealing process the fill material 24 held in the enclosed envelope 12 may heat, and expand relative to the pressure of the vessel 52. If the enclosed envelope 12 volume were large enough or initially cool enough, the pressure change induced by the sealing heat might be insubstantial with respect to the total pressure sought in the final product. In small lamps, the sealing heat induced expansion is likely sufficient to drive a substantial portion of the fill material 24 out of the envelope 12. The Applicants counteracted this outflow from the envelope 12 by increasing the vessel 52 pressure at the same time the seal region is being heated. If the vessel 52 pressure is increased in proportion to the temperature increase of the enclosed fill material, the volume of the enclosed fill material 24 captured in the lamp capsule remains constant. With the increasing temperature, one or both of the adjacent envelope 12 and wafer 20 (or frit if used) melt and seal one to the other along their common region of adjacency. While the seal is in a soft or molten state, it could be damaged, or blown outwards if the enclosed fill material 24 is heated and thereby achieves an internal envelope pressure greater than the exterior vessel pressure. In the preferred embodiment the vessel 52 pressure is then adjusted to offset any detrimental difference in pressure between the enclosed envelope and the vessel. It is understood that excess pressure on vessel side tends to close the pieces and thereby complete the seal. The soft or molten seal region then senses equal pressure from each side, and remains motionless, except for the gentle contact pressure from the ferrule. Once the fusing of the envelope 12 and wafer 20 has occurred, induction heating may be stopped. Again, the vessel 52 pressure is controlled to prevent damage to the lamp seal. The sealed envelop 12 then cools. The vessel 52 is then opened and the sealed lamp 10 is retrieved.

The high pressure lamp 10 may then be incorporated into a base by known methods. For example, the ferrule may include a cylindrical wall extending axially away from the light source. The cylindrical wall may include a groove, thread, tab, notch, rib or similar formed feature that may be used to couple to a base piece. The ferrule is then welded, braised, clipped, threaded or otherwise coupled to a base in a basing machine.

While maintaining all of the advantages of prior high pressure filled lamps, the new lamp eliminates the use of an exhaust tube; can use a wafer stem in place of a sintered glass wafer; combines the seal and exhaust processes into one step and combines the related equipment. The combined process reduces the time required to seal and exhaust the lamp.

Lamps have been sealed and tested at 3 and 3.5 bar (cold) demonstrating the ability to seal at high fill pressure while eliminating the exhaust tube used in prior art assemblies and the associated exhaust machinery. This is achieved by combining the sealing and exhausting steps into one operation in a single, rapid process.

Several 18 millimeter diameter bulbs with 3.5 bar xenon gas fill were made by this method. Photometry showed normal light output. Aged lamps lasted 2000 hours, that is the design life of the product.

Lamps were made in a vessel with the following process features. The vessel was formed from fused silica, and had an inside diameter of 25 millimeters, an outside diameter of 28 millimeters and an axial length of 200 millimeters. Three pump and flush cycles were used. The final fill pressure was 3.5 atmospheres (absolute). The time needed for RF heating to create a good seal was only about 10 or 15 seconds.

The constructed lamps had the following dimensions and features. The bulb diameter was 18 millimeters, with an axial length of 27 millimeter. The bulb wall thickness was 0.4 millimeters (minimum). The bulb material was Philips NV 360 glass. The bulb had a circular opening at one end with a diameter of 7 millimeters.

The filament size had a coil length of 4 millimeter, coil diameter 0.75 millimeter; wire diameter of 0.09 millimeter (coil designation WV 10614/B1). The coil legs were laser welded to two leads. The leads were made of 52 Alloy ("Niron") and were 0.6 millimeter in diameter and 25 to 30 millimeters long respectively. The leads were sealed through a wafer. The leads were spaced apart on the wafer by 4.0 millimeter. The wafer had a step shaped edge to conformally mate with the circular opening in the bulb envelope. The wafer had a thickness of 2.6 millimeter (1.5 mm by 5.8 mm over 1.1 mm by 8.1 mm). The wafer was made of sintered glass (Kimbal R6 glass).

The ferrule had a 10 millimeter outside diameter and was made of 42-6 Alloy (42% Nickel, 6% Chrome with the balance Iron.). The ferrule was shape like a dish with central hole. It had a wafer thickness of 0.3 millimeter. The ferrule outside diameter was 10.0 millimeters. The ferrule inside diameter was 6.0 millimeter. The ferrule "bowl" depth was 1 millimeter. The ferrule was made of 42-6 alloy.

The fill material was Xenon with two percent (2%) Nitrogen. The fill pressure (cold) was 3.0 atmospheres of xenon in the finished lamp. The lamps had operating voltages of 12 volts and 13.5 volts. Lamps with operating voltages of 13.5 volts used 17.7 watts and provided 311 lumens or about 17.6 lumens per watt.

The first lamp had 2 atmospheres of xenon and burned base down for greater than 5000 hours at voltages of 12.8 and 13.8 volts. The exact number of hours at each voltage is not known. Most of the lamp burning took place at 13.8 volts. After 5000 hours, at 12.8 volts the lamp ran with 1.3083 amps, providing 16.8 watts, 172 spectral lumens (10.2 lumens per watt) with a color temperature of 2717 and a chromaticity of X: 0.4585 and Y: 0.4103. At 13.8 volts the lamp ran with 1.3621 amps, and provided 18.8 watts, 220 spectral lumens (11.7 lumens per watt) with a color temperature of 2788 and a chromaticity of X: 0.4529 and Y: 0.4091.

Similar lamps 2, 3 and 4 were measured at zero hours. There is no life test data as of yet. These lamps had from 2 to 3 atmospheres of xenon and burned base down for greater than 1.0 hour at voltages of 12.8 and 13.8 volts. At 12.8 volts the lamps ran with an average of 1.3264 amps, providing 17.0 watts, 244 spectral lumens (14.4 lumens per watt) with a color temperature of 2815 and a chromaticity of X: 0.4508 and Y: 0.4086. At 13.8 volts the lamp ran with and average of 1.3835 amps, providing 17.7 watts, 311 spectral lumens (17.6 lumens per watt) with a color temperature of 2889 and a chromaticity of X: 0.4452 and Y: 0.4071. It is estimated from the existing lumen maintenance, that lumen maintenance at 5000 hours should be about 70 percent.

Several advantages of the RF sealed lamp are believed to exist. No frit is needed to seal the lamp. Frits generally include lead or other toxic materials to lower the melting point of the frit. Frits also outgas undesirable materials into the lamp cavity, contaminating the lamp and shortening the lamp's life. There is no exhaust tube. Exhaust tubes cost money to make, and to include in the wafer. Exhaust tubes can fracture during the lamp assembly process, or installation of the base resulting in a process loss. The exhaust tube also represents a separate series of manufacturing steps (costs) that are avoided in the present assembly method. The exhaust tube does not have to be coupled to, nor does the lamp have to be purged, and filled through the small diameter exhaust tube, which are rather time consuming procedures. The present lamp structure allows the use of inexpensive glass materials, such as soft lime glasses.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A method of making a high pressure lamp comprising the steps of:
    a) providing a high pressure vessel;
    b) locating an electric induction energy source near the vessel;
    c) locating in the vessel a lamp capsule having a wall defining an enclosed volume and an opening;
    d) filling the enclosed volume with a fill material;
    e) locating a wafer adjacent the opening, the wafer spanning the capsule opening along a region of adjacency,
    f) positioning an electric induction heatable energy receiver near the region of adjacency;
    g) supplying sufficient electric power to the induction energy source to induce heating of the receiver and hereby inducing heating of the capsule and wafer along the region of adjacency; and
    h) fusing the wafer to the capsule along the region of adjacency thereby sealing the capsule and the wafer.

2. The method in claim 1, wherein the wafer includes at least a portion of a light source.

3. The method in claim 1, wherein the lamp capsule includes at least a portion of a light source.

4. The method in claim 1, wherein the vessel is formed from quartz.

5. The method in claim 1, wherein the induction energy source is located to encircle the vessel.

6. The method in claim 1, wherein the induction energy source is a radio frequency energy source supplying radio frequency (RF) power at 5.0 MHz or greater.

7. The method in claim 1, wherein the receiver is a metal body having a surface conformal with a portion of the wafer.

8. The method in claim 7, after the step of fusing, further includes the step of coupling a base to the metal body.

9. The method in claim 7, further including the step of electrically coupling a lead to the metal body.

10. The method in claim 7, wherein the metal body has sufficient size and shape to span the capsule region defining the opening.

11. The method in claim 7, wherein the metal body includes a lip at least partially encircling exterior circumferences of the envelope and wafer to guide the sealing of the envelope and wafer.

12. The method in claim 7, wherein the metal body is pressed against the wafer.

13. The method in claim 7, wherein the metal body is pressed against the envelope.

14. The method in claim 1, wherein the envelope is held in a recess substantially conforming to a portion of the envelope.

15. The method in claim 1, wherein the vessel pressure is regulated so that the envelope pressure and the vessel pressure are nearly equal during at least the initial fusing of the wafer portion with the envelope portion.

16. The method in claim 1 wherein the vessel pressure is regulated after the initial fusing of the wafer portion with the envelope portion to work the material as it fuses.

17. The method in claim 15, wherein subsequent to the fusing of the capsule and the wafer, the vessel pressure is increased to be above the pressure of the enclosed fill material.

18. The method in claim 1, wherein the sealed lamp is initially cooled with a vessel pressure in excess of the enclosed fill pressure.

19. The method in claim 1, further including, prior to sealing, the step of painting a frit material on the wafer in a region along the region where the bulb portion and the wafer portion seal.

20. The method in claim 1, wherein the envelope and wafer during sealing are pressed together by a small spring force.

21. The method in claim 1, wherein the receiving piece is detached from the wafer after sealing is completed.

22. The method in claim 1, further including the steps of:

electrically coupling the first lead to the metal body;

mechanically coupling a base to the metal body; and electrically coupling the second lead to an electrical contact held by the base.

23. The method in claim 1, wherein the filling is to a pressure in excess of 1 atmosphere at ambient temperature.

* * * * *